United States Patent Office 3,474,142
Patented Oct. 21, 1969

3,474,142
PROCESSES FOR PREPARATION OF
ACRYLAMIDE
Claude Darcas, Rene Allirot, and Charles Laviron, Saint-Avold, France, assignors to Ugine Kuhlmann, Paris, France, a corporation of France
No Drawing. Filed July 6, 1966, Ser. No. 563,094
Claims priority, application France, July 13, 1965, 24,537
Int. Cl. C07c 103/08
U.S. Cl. 260—561                                  2 Claims

ABSTRACT OF THE DISCLOSURE

A process for preparing monomeric acrylamide by a first stage neutralization of acrylamide prepared by sulphuric hydrolysis of acrylonitrile and in a second stage acrylamide extraction from the neutralized medium the treatment of the medium being below 60° C. with acrylonitrile that forms an organic phase containing acrylamide, acrylonitrile, and water, and finally recovering acrylamide by separating at least a part of the acrylonitrile from the organic phase by distillation.

---

This invention relates to preparation of monomeric acrylamide from raw acrylamide obtained by hydrolysis of acrylonitrile in a sulphuric acid medium.

The usual processes comprise neutralizing the raw acrylamide solution by various alkaline or alkaline-earth agents, such as lime, calcium carbonate, sodium carbonate, ammonia, etc. According to the operating conditions, the sulphate is more or less completely precipitated, or the alkaline sulphate remains in solution. Acrylamide is separated from the solution by various solvents or special resins.

In particular, it has been proposed to use organic solvents insoluble, or slightly soluble in water, for example methylethylketone, methylisobutylketone, alcohols such as butanol, certain esters, hydrocarbons such as benzene, etc. The acrylamide thus extracted by the solvents remains in an organic phase, while the inorganic salts pass into an aqueous phase.

The organic solution is then concentrated by evaporation, and submitted to crystallizing, and afterwards the amide crystals are treated to eliminate traces of the solvent.

This operating method has some disadvantages. In particular, the use of an alien solvent introduced in the course of operations requires its complete elimination to prevent contamination of the final product by a supplementary impurity. The utilized solvent must be recovered, generally by evaporation during concentration of the amide organic solution. Also, the solvent accompanying the crystals during the amide crystallization must be recovered by recycling the crystallization mother-liquor during extraction or during concentration. Such recoveries are accompanied by impurities which are always contained in the solvents and which become more concentrated after each extraction cycle. Thus, a purification of the alien solvent must be made after each cycle, which involves losses and expenses. Finally, valorization of the aqueous phase which contains ammonium sulphate and traces of acrylonitrile and of acrylamide is rendered difficult by the presence of important traces of the alien solvent.

The process of the invention obviates these disadvantages. It comprises neutralizing the raw acrylamide solution obtained by sulphuric acid hydrolysis of acrylonitrile under the usual conditions, extracting the acrylamide contained in the aqueous solution by acrylonitrile, and removing all or part of the acrylonitrile by distillation, to obtain a concentrated acrylamide solution in pure water or in water still containing acrylonitrile, or an anhydrous acrylamide solution in acrylonitrile, from which acrylamide crystals are eventually precipitated, for example by cooling down.

Among the neutralizing agents, we prefer those which produce sulphates soluble in the neutralized medium and which lead to homogeneous solutions, or to solutions slightly charged with precipitated sulphates, and in particular gaseous or aqueous ammonia. However, it is possible to carry out the process with any other agent. The neutralized medium has a pH between 3 and 8, and preferably about 7.

With ammonia, the raw acrylamide solution can be favorably neutralized below 60° C., and preferably below 40° C., to a pH of about 7.

Under these conditions, secondary reactions of polymerization or of addition of ammonia on acrylamide remain very limited, or practically null.

The acrylamide separation from the obtained aqueous solution may be carried out in several ways: discontinuously by exhaustion through successive treatments with new charges of acrylonitrile; or continuously by counter-flow in a classic liquid/liquid extraction column, or in a series of mixer-decanters.

With homogeneous neutralized solutions, acrylonitrile is normally introduced into the bottom of the extraction column, but important amounts of acrylonitrile may already be present in the raw sulphuric amide submitted to the neutralization.

The extraction temperature must be below about 60° C.

The use of acrylonitrile as the extraction agent of acrylamide from its water/sulphate medium, is judicious because the various components of the mixture have then a synergetic effect for the formation of an aqueous phase substantially free from acrylamide and acrylonitrile, and of an organic phase substantially free from sulphate.

Interestingly, acrylonitrile alone dissolves little acrylamide, and the acrylonitrile/acrylamide solution contains about 11.8% by weight of acrylamide at 20° C., and about 20% by weight at 29° C. Furthermore, if there is no salt present, acrylamide is extremely soluble in water: for example, the saturated solution contains 60% by weight of acrylamide at 20° C. Likewise, acrylonitrile alone dissolves little water: thus at 20° C., acrylonitrile saturated in water contains 3.1% water. However, in the presence of acrylamide, acrylonitrile dissolves much more water, and the solubility of acrylamide in acrylonitrile is then substantially increased: for example, at 20° C., acrylonitrile containing 0.96%–2.54%–18% water, may respectively dissolve 14%–21%–43% by weight of acrylamide.

In the same way, pure water which dissolves acrylonitrile in a non-negligible manner (the saturated solution at 20° C. contains 7.35% acrylonitrile) dissolves a far lesser amount when it contains an alkaline sulphate: for example, at 20° C., an aqueous solution at 40% by weight ammonium sulphate and saturated in acrylonitrile, contains only 0.45% acrylonitrile.

Finally, if, for instance at 25° C., 100 g. of an aqueous solution containing 15.5 g. acrylamide and 28 g. ammonium sulphate are treated with 51.5 g. acrylonitrile, 11.25 g. acrylamide are extracted—that is 72.6% of the initial amount. The organic phase which is formed contains only traces of sulphate, i.e. 0.07%.

By extracting the acrylamide contained in a solution neutralized by ammonia with acrylonitrile, we obtain, on the one hand, an aqueous phase which comprises diammonium sulphate, traces of acrylamide, of acrylonitrile and eventually of acrylic acid and/or ammonium acrylate. This aqueous phase is treated to recover the valuable elements contained therein, and especially the ammonium sulphate. On the other hand, there is obtained an organic phase which comprises a certain amount of water, a small quantity of ammonium sulphate, eventual traces of acrylic acid and/or ammonium acrylate, the major part of the acrylonitrile utilized and the major part of acrylamide. The organic phase is subjected to a distillation, preferably under vacuum to eliminate and recover acrylonitrile as a water/acrylonitrile azeotrope containing about 12% water. This azeotrope is then treated to separate acrylonitrile which finally is recycled at the extraction step.

The distillation bottom may be formed of an aqueous solution free from acrylonitrile, containing 10 to 50% acrylamide by weight, and in some cases to about 60% acrylamide by weight. This solution may be utilized as it is for direct polymerization. In a modification, we extend the evaporation beyond the eutectic point to obtain acrylamide as highly pure crystals which are then separated by any known means. In this modification, we cool down to 0° C. and preferably to −5° C. The crystallization motherliquors containing acrylamide and a small amount of ammonium sulphate, and eventually acrylic acid and/or ammonium acrylate may be recycled toward the extraction or used for acrylate preparation.

If desired, it is possible, during the distillation, to regulate the acrylonitrile elimination so that the distillation bottom is an aqueous solution concentrated in acrylamide and still containing acrylonitrile, or is an anhydrous or a substantially anhydrous solution of acrylamide in acrylonitrile. The concentrated solution of acrylamide in acrylonitrile may be treated for direct polymerization, or utilized to give acrylamide crystals, such as by cooling down below its saturation point.

The acrylonitrile is used in amounts of about 300 g. to 3500 g. per 100 g. of acrylamide to be extracted and preferably in amounts of about 600 g. to 800 g. per 100 g. of acrylamide.

The invention has numerous advantages in comparison with the known processes. It utilizes no alien solvent such as alcohol, ester, ketone, for the acrylonitrile used as the extraction solvent is also the raw material of the production. Due to the water/acrylonitrile azeotrope, it is possible by concentration to obtain an aqueous solution of acrylamide which may be commercial as is or may be submitted to crystallization. The acrylamide crystals obtained contain no alien solvent thereby avoiding the elimination of a residuary solvent.

The process, which may be carried out discontinuously, lends itself perfectly to a continuous exploitation.

The following non-limitative examples illustrate the invention process.

EXAMPLE 1

The utilized solution was a raw acrylamide solution, obtained by acrylonitrile hydrolysis in a sulphuric acid medium, of the following composition by weight:

|  | Percent |
|---|---|
| Acrylamide | 40.05 |
| Sulphuric acid | 57.31 |
| Acrylonitrile | 0.73 |
| Ammonium sulphate | 0.91 |
| Acrylic acid | 1.00 |

38.2 g. of this solution were neutralized to a pH of about 6 by a 14.3% by weight aqueous ammonia solution. The neutralized solution contained, by weight:

|  | Percent |
|---|---|
| Acrylamide | 15.5 |
| Ammonium sulphate | 30.2 |
| Water | 53.6 |

98.6 g. of the neutralized solution were stirred at 20° C. in a decanter with 97 g. acrylonitrile. After decantation, an organic phase was obtained containing:

|  | Percent |
|---|---|
| Acrylamide | 10.4 |
| Ammonium sulphate | 0.035 |
| Acrylonitrile | 84.65 |
| Water, about | 4.8 | and an aqueous phase containing:

|  | Percent |
|---|---|
| Acrylamide | 4.17 |
| Ammonium sulphate | 36.51 |
| Acrylonitrile | 0.95 |

The remainder being principally formed of water.

77.8% of the acrylamide contained in the neutralized solution was extracted.

EXAMPLE 2

The operation was carried out continuously by introducing into a vessel, 318.8 g./h. of a raw acrylamide solution of the following composition:

|  | Percent |
|---|---|
| Acrylamide | 40.00 |
| Sulphuric acid | 57.31 |
| Acrylic acid | 1.00 |
| Acrylonitrile | 0.73 |
| Ammonium sulphate | 0.91 |

380 g./h. of water and gaseous ammonia were simultaneously introduced into the vessel to neutralize the solution and bring it to a pH of about 6, the temperature being maintained at 30° C. The obtained solution contained:

|  | G. |
|---|---|
| Acrylamide | 127.7 |
| Acrylonitrile | 2.3 |
| Acrylic acid | 3.17 |
| Water | 380 |
| Ammonium sulphate | 248.8 |

This solution was continuously introduced to the top of a liquid/liquid extraction column, at the rate of 762 g./h. while 598.3 g./h. acrylonitrile were introduced simultaneously into the bottom of the column.

From the top of the column was collected, at the rate of 766 g./h., the solution of acrylamide in acrylonitrile of the following composition:

|  | Percent |
|---|---|
| Amide | 16.5 |
| Acrylonitrile | 78 |
| Acrylic acid | 0.2 |
| Sulphate | 0.05 |
| Water, about | 5.25 | and at the bottom a saline aqueous solution, at the rate of 594.3 g./h., and with the following composition:

|  | Percent |
|---|---|
| Amide | 0.22 |
| Acrylonitrile | 0.52 |
| Acrylic acid | 0.28 |
| Ammonium sulphate | 41.8 |

The remainder being formed of water.

Thus, 98.9% of the acrylamide was extracted. The acrylamide/acrylonitrile solution was distilled, under 50 mm. mercury, by steam entrainment. A 721.9 g./h. distillate was obtained corresponding to the following global composition:

|  | G. |
|---|---|
| Acrylonitrile | 597.5 |
| Acrylic acid | 0.9 |
| Water | 123.5 |

The distillation residue, at the rate of 183.8 g./h. contained:

| | Percent |
|---|---|
| Water | 30.9 |
| Acrylamide | 68.55 |
| Ammonium sulphate | 0.25 |
| Acrylic acid | 0.3 |

By cooling down this residue to 0° C., practically pure crystallized acrylamide was obtained. The crystallization mother-liquors, at the rate of 99 g./h., contained:

| | Percent |
|---|---|
| Amide | 42.93 |
| Acrylic acid | 0.6 |
| Ammonium sulphate | 0.4 |
| Water | 56.07 | and were recycled.

We claim:
1. In a process for preparing acrylamide by hydrolysis of acrylonitrile in a sulfuric acid reaction medium, the improvement in combination therewith comprising.

(A) neutralizing the reaction medium with ammonia to obtain an aqueous solution of acrylamide and ammonium sulfate;
(B) treating the aqueous solution at a temperature below 60° C. with acrylonitrile to form an organic phase of acrylamide, acrylonitrile and an insubstantial part water and an aqueous phase of ammonium sulfate; and
(C) separating said acrylamide from said organic phase.

2. The process of claim 1 wherein the amount of said acrylonitrile used in said treating is about 300–3,500 g. per 100 g. of acrylamide to be recovered.

References Cited
UNITED STATES PATENTS 3,257,454  6/1966  Heckle _____ 260—561
3,023,242  2/1962  Bornemann et al. ____ 260—561

NICHOLAS S. RIZZO, Primary Examiner

J. A. NARCAVAGE, Assistant Examiner